US012780125B2

(12) United States Patent
Gunner et al.

(10) Patent No.: US 12,780,125 B2
(45) Date of Patent: Nov. 3, 2026

(54) EXTENDED-USE MODE FOR AN ANCILLARY VEHICLE FUNCTION

(71) Applicant: JAGUAR LAND ROVER LIMITED, Whitley (GB)

(72) Inventors: Michael Gunner, Whitley (GB); Gary Edwards, Whitley (GB); Luke Sanders, Whitley (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 110 days.

(21) Appl. No.: 18/683,726

(22) PCT Filed: Aug. 18, 2022

(86) PCT No.: PCT/EP2022/073127
§ 371 (c)(1),
(2) Date: Feb. 14, 2024

(87) PCT Pub. No.: WO2023/021161
PCT Pub. Date: Feb. 23, 2023

(65) Prior Publication Data

US 2024/0383420 A1 Nov. 21, 2024

(30) Foreign Application Priority Data

Aug. 20, 2021 (GB) ...................................... 2111943

(51) Int. Cl.
*B60R 16/03* (2006.01)
*B60W 10/26* (2006.01)
(Continued)

(52) U.S. Cl.
CPC ............. *B60R 16/03* (2013.01); *B60W 10/26* (2013.01); *B60W 50/14* (2013.01);
(Continued)

(58) Field of Classification Search
CPC ....... B60R 16/03; B60W 10/26; B60W 50/14; B60W 2050/0095; B60W 2510/244;
(Continued)

(56) References Cited

U.S. PATENT DOCUMENTS 4,493,001 A 1/1985 Sheldrake
5,089,762 A 2/1992 Sloan
(Continued)

FOREIGN PATENT DOCUMENTS

JP 2020043689 A 3/2020
WO 9115889 A1 10/1991

OTHER PUBLICATIONS

Great Britain Intellectual Property Office, Combined Search and Examination Report Issued in Application No. GB2111943.3, Feb. 10, 2022, 6 pages.
(Continued)

*Primary Examiner* — Sihar A Karwan
(74) *Attorney, Agent, or Firm* — McCoy Russell LLP

(57) ABSTRACT

There is provided a method, a computer program and a control system for a vehicle. The control system comprises one or more controllers, wherein the control system is configured to: in a first operating mode, deactivate an ancillary vehicle function in dependence on a powertrain of the vehicle entering a deactivated state; and in a second operating mode, enable the ancillary vehicle function to be used while the powertrain is in the deactivated state, in dependence on monitored energy availability of a battery of the vehicle being greater than a depletion limit of the battery, wherein the depletion limit of the battery is dependent on one or more monitored variable parameters.

20 Claims, 3 Drawing Sheets

(51) Int. Cl.
*B60W 50/14* (2020.01)
*B60W 50/00* (2006.01)

(52) U.S. Cl.
CPC ............... *B60W 2050/0095* (2013.01); *B60W 2510/244* (2013.01); *B60W 2510/246* (2013.01)

(58) Field of Classification Search
CPC ........... B60W 2510/246; B60W 10/30; B60W 30/1886; H02J 2310/46; H02J 2310/48; H02J 7/0048; H02J 7/0063; H02J 9/002; Y02T 10/70
See application file for complete search history.

(56) References Cited

U.S. PATENT DOCUMENTS

| | | | | |
|---|---|---|---|---|
| 5,119,011 | A | 6/1992 | Lambert | |
| 5,332,958 | A * | 7/1994 | Sloan | H02J 7/0047 320/136 |
| 6,249,106 | B1 * | 6/2001 | Turner | H02J 7/0032 320/136 |
| 2004/0232881 | A1 * | 11/2004 | Amano | H02J 9/002 320/104 |
| 2009/0146846 | A1 * | 6/2009 | Grossman | B60R 25/04 340/988 |
| 2011/0012553 | A1 * | 1/2011 | Sloan | B60K 6/365 320/105 |
| 2013/0200848 | A1 * | 8/2013 | Ozawa | B60L 58/19 320/112 |
| 2015/0005986 | A1 * | 1/2015 | Kantajaraniti | B60R 25/10 701/2 |
| 2015/0137594 | A1 * | 5/2015 | Yamazaki | H02J 7/345 307/10.1 |
| 2017/0331162 | A1 * | 11/2017 | Clarke | H02J 7/0069 |
| 2019/0033383 | A1 * | 1/2019 | Karner | H01M 10/425 |
| 2019/0160972 | A1 * | 5/2019 | Zeiler | H01M 10/441 |
| 2019/0176639 | A1 * | 6/2019 | Kumar | G07C 5/0808 |
| 2020/0072177 | A1 * | 3/2020 | Clarke | H02J 7/0048 |
| 2020/0072178 | A1 * | 3/2020 | Berkson | B60W 10/26 |
| 2020/0346547 | A1 * | 11/2020 | Rocholl | B65F 3/04 |
| 2020/0346556 | A1 * | 11/2020 | Rocholl | B60L 53/80 |
| 2022/0144605 | A1 * | 5/2022 | Lobo | B66D 1/12 |
| 2023/0017327 | A1 * | 1/2023 | Weston | B60W 40/12 |

OTHER PUBLICATIONS

ISA European Patent Office, International Search Report and Written Opinion Issued in Application No. PCT/EP2022/073127, Dec. 12, 2022, 12 pages.

* cited by examiner

EXTENDED-USE MODE FOR AN ANCILLARY VEHICLE FUNCTION

CROSS REFERENCE TO RELATED APPLICATIONS

The present application is a U.S. National Phase of International Application No. PCT/EP2022/073127 entitled "EXTENDED-USE MODE FOR AN ANCILLARY VEHICLE FUNCTION," and filed on Aug. 18, 2022. International Application No. PCT/EP2022/073127 claims priority to Great Britain Patent Application No. 2111943.3 filed on Aug. 20, 2021. The entire contents of each of the above-listed applications are hereby incorporated by reference for all purposes.

TECHNICAL FIELD

The present disclosure relates to an extended-use mode for an ancillary vehicle function. In particular, but not exclusively it relates to extended-use of the ancillary vehicle function by using a starting-lighting-ignition battery (SLI battery) while the vehicle is parked. Aspects of the present invention relate to a control system, to a method, to a vehicle, and to computer software.

BACKGROUND

It is known for a vehicle to comprise an internal combustion engine ('engine') as part of its powertrain. The engine is coupled to an electric machine such as an alternator configured to generate continuous electrical power while the engine is running.

The vehicle typically comprises a starting-lighting-ignition battery (SLI battery) for starting the engine and for powering limited vehicle functions while the powertrain is in a deactivated state with the engine off.

Due to the low capacity, low voltage and small size of a typical SLI battery, it is typical for most vehicle functions to be disabled immediately or very soon after the powertrain has been deactivated when the vehicle is parked.

Some specialist leisure vehicles or commercial vehicles comprise an auxiliary battery or auxiliary power unit to supply electrical power to vehicle functions for a long-duration while the vehicle is parked and the powertrain is in a deactivated state. Such systems add weight and take up vehicle packaging space.

SUMMARY OF THE INVENTION

It is an aim of the present invention to enable improved control of an ancillary vehicle function. The invention is as defined in the appended independent claims.

According to an aspect of the invention there is provided a control system for a vehicle, the control system comprising one or more controllers, wherein the control system is configured to:

in a first operating mode, deactivate an ancillary vehicle function in dependence on a powertrain of the vehicle entering a deactivated state; and in a second operating mode, enable the ancillary vehicle function to be used while the powertrain is in the deactivated state, in dependence on monitored energy availability of a battery of the vehicle being greater than a depletion limit of the battery, wherein the depletion limit of the battery is dependent on one or more monitored variable parameters.

An advantage is improved control of the ancillary vehicle function because the user is provided with a reasonable duration of time to use their ancillary vehicle function while the vehicle is not running, without compromising vehicle startability.

In some examples, the one or more monitored variable parameters are indicative of at least one of: capacity of the battery; internal resistance of the battery; or temperature of the battery. In some examples, the depletion limit is configured to rise in dependence on at least one of: capacity of the battery falling; internal resistance of the battery rising; temperature of the battery being below a threshold; or temperature of the battery being above a threshold.

An advantage is that the duration of time is proportionate to a state of health or external environment of the battery, enabling longer periods of use in ideal conditions.

In some examples, the battery comprises a starting-lighting-ignition SLI battery configured to start an engine of the vehicle. In some examples, the SLI battery comprises a nominal voltage of less than 60V. In some examples, the SLI battery comprises one or more Lithium-ion cells.

In some examples, the depletion limit comprises an engine-start reserve. An advantage is reduced vehicle weight because the vehicle does not need to comprise an additional auxiliary battery/auxiliary power unit.

In some examples, in the first operating mode, the deactivation of the ancillary vehicle function is based on a timer configured to expire after the deactivated state has been entered. In some examples, the second operating mode is configured to pause the timer.

In some examples, the second operating mode is a user-requestable operating mode. In some examples, the ancillary vehicle function comprises a vehicle entertainment function. In some examples, the ancillary vehicle function comprises a loudspeaker function. In some examples, the second operating mode requires a rear tailgate of the vehicle to be opened. An advantage is that the vehicle is well-equipped for tailgate events because entertainment devices can be powered by the battery for an optimum duration, without engine start.

In some examples, the control system is configured to transition from the second operating mode to the first operating mode in dependence on the depletion limit of the battery being reached, without requesting engine-activation. An advantage is avoidance of local emissions, for example because the user may be outside the vehicle and close to an exhaust tailpipe of the vehicle. For example, the user may be using the vehicle for a tailgate event.

In some examples, the control system is configured to cause one or more output devices to output user feedback indicating a closeness of the monitored energy availability is to the depletion limit. An advantage is improved consistency for the user because the advance user feedback compensates for the variable (unpredictable) nature of the depletion limit.

In some examples, the user feedback comprises a visual scale having a minimum set at the depletion limit. An advantage is improved consistency for the user because the displayed minimum remains the same despite the depletion limit changing.

In some examples, the user feedback comprises an alert configured to indicate when the depletion limit is reached.

According to a further aspect of the invention there is provided a vehicle comprising the control system and ancillary vehicle function.

According to a further aspect of the invention there is provided a method comprising:

in a first operating mode, deactivating an ancillary vehicle function of a vehicle in dependence on a powertrain of the vehicle entering a deactivated state; and in a second operating mode, enabling the ancillary vehicle function to be used while the powertrain is in the deactivated state, in dependence on monitored energy availability of a battery of the vehicle being greater than a depletion limit of the battery, wherein the depletion limit of the battery is dependent on one or more monitored variable parameters.

According to a further aspect of the invention there is provided computer software that, when executed, is arranged to perform any one or more of the methods described herein. According to a further aspect of the invention there is provided a non-transitory computer readable medium comprising computer readable instructions that, when executed by a processor, cause performance of any one or more of the methods described herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination that falls within the scope of the appended claims. That is, all embodiments and/or features of any embodiment can be combined in any way and/or combination that falls within the scope of the appended claims, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
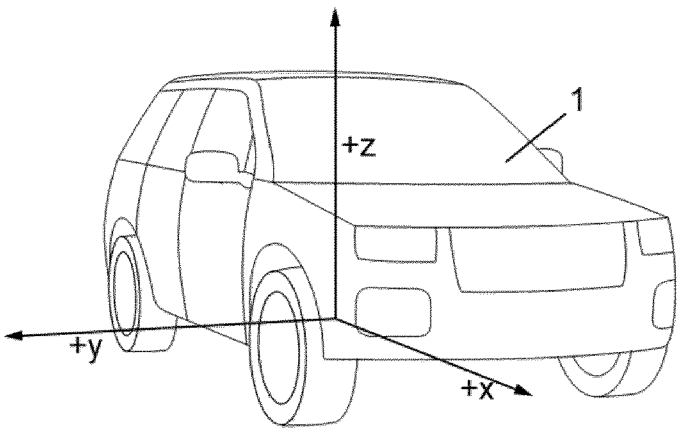
FIG. 1 illustrates an example of a vehicle.

FIG. 1 illustrates an example of a vehicle 1 in which embodiments of the invention can be implemented. In some, but not necessarily all examples, the vehicle 1 is a passenger vehicle, also referred to as a passenger car or as an automobile. In other examples, embodiments of the invention can be implemented for other applications, such as commercial vehicles.

Figure 2:
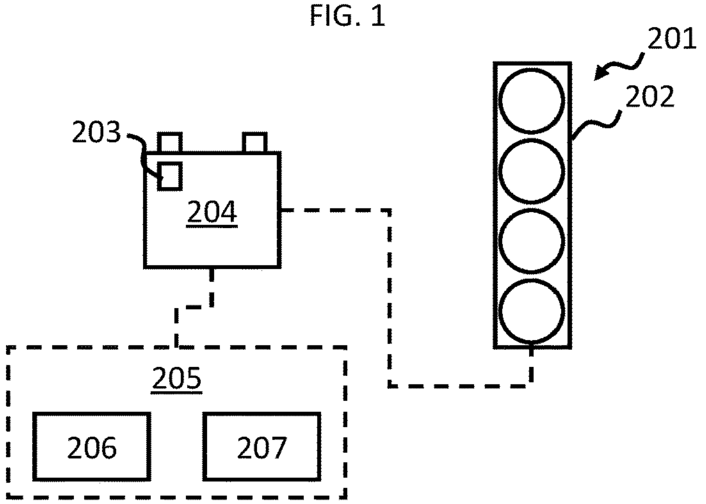
FIG. 2 illustrates an example of a battery.

FIG. 2 illustrates an example of a battery 204 for the vehicle 1. A powertrain 201 of the vehicle 1 comprises an engine 202 and the battery 204 comprises a SLI battery. The SLI battery 204 is configured to provide electrical power to a starter motor to start an engine 202 of the vehicle 1. The SLI battery 204 comprises a nominal DC voltage of less than 60V, such as 12V or 24V. In some examples, the SLI battery 204 may be the highest capacity battery that the vehicle 1 has, or the only battery that the vehicle 1 has. In some implementations, the vehicle 1 is a plug-in hybrid electric vehicle and the SLI battery 204 is separate from a high voltage traction battery.

According to an aspect of the invention, the SLI battery 204 is further configured to provide electrical power to an ancillary vehicle function 205 while the vehicle 1 is not running. An ancillary vehicle function 205 refers to a non-driving function that is secondary to the vehicle's primary function of driving.

For example, the SLI battery 204 can be further configured to provide electrical power to a loudspeaker 206, or to another suitable entertainment function of the vehicle 1, while the vehicle 1 is not running. Therefore, an entertainment function can be made available for an extended duration while a vehicle 1 having an SLI battery 204 is not running. In an example implementation, a short range wireless personal/local area network interface (e.g., Bluetooth™/WiFi™ interface) of the vehicle 1 may be active and able to play audio through a set of loudspeakers 206 of the vehicle 1.

In some implementations, the SLI battery 204 is configured to provide electrical power for auxiliary equipment while the vehicle 1 is not running, for example by providing electrical power to an electrical receptacle 207 of the vehicle 1. Therefore, auxiliary equipment can be run for an extended duration while a vehicle 1 having an SLI battery 204 is not running.

In at least some examples, the SLI battery 204 comprises Lithium-ion cells 203 to provide capacity to run the ancillary vehicle function 205 for an extended duration of time, such as longer than an hour.

The energy to be used for powering the ancillary vehicle function 205 is the same energy, from at least some of the same battery cells 203 of the SLI battery 204, as the energy that is needed to start the engine 202 next time the user intends to drive the vehicle 1.

Figure 4:
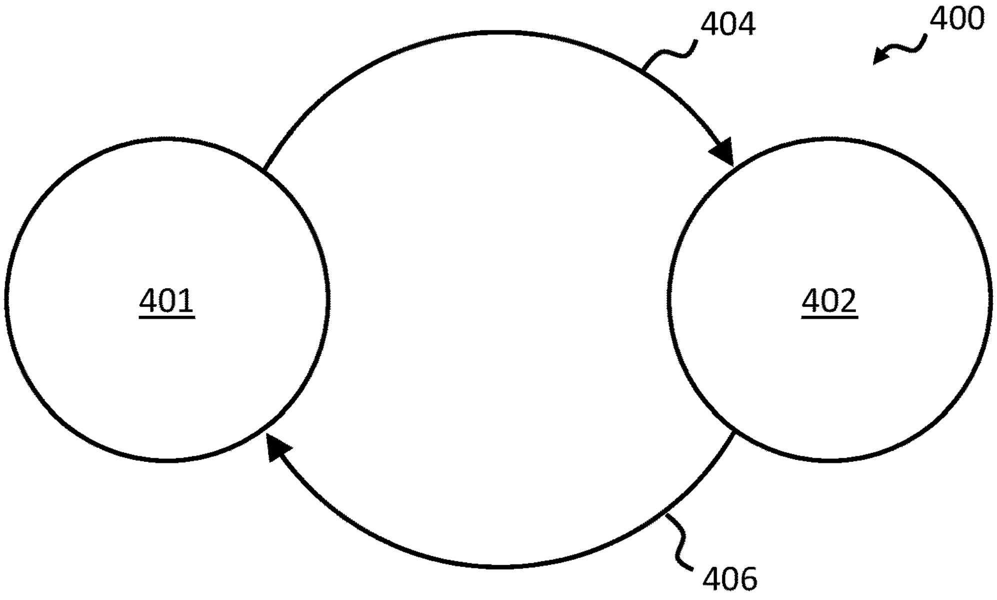
FIG. 4 illustrates an example of a state diagram.

Therefore, the control method 400 described below and shown in FIG. 4 provides the user with a reasonable length of time to use their ancillary vehicle function 205 while the vehicle 1 is not running, without compromising the engine-starting capacity of the battery 204.

Figure 3A:
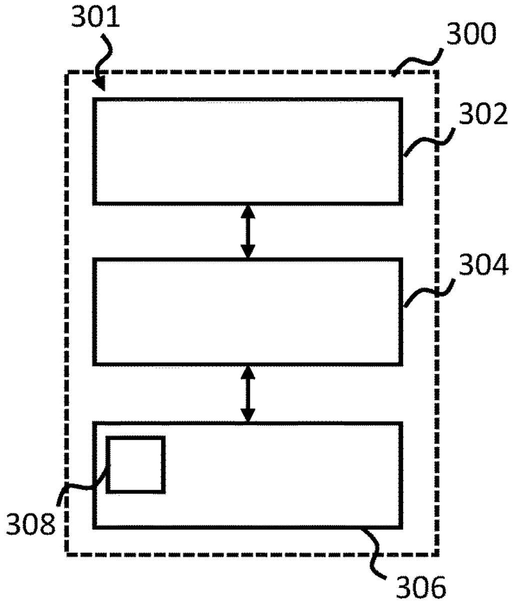
FIG. 3A illustrates an example of a control system.
Figure 3B:
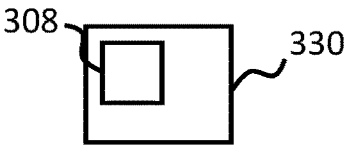
FIG. 3B illustrates an example of a non-transitory computer-readable storage medium.

First, an example of a suitable control system 300 for carrying out the control method 400 is shown in FIG. 3A and described. The control system 300 comprises at least one controller 301. The controller 301 of FIG. 3A includes at least one processor 304; and at least one memory device 306 electrically coupled to the electronic processor 304 and having instructions 308 (e.g. a computer program) stored therein, the at least one memory device 306 and the instructions 308 configured to, with the at least one processor 304, cause any one or more of the methods described herein to be performed. The processor 304 may have an interface 302 such as an electrical input/output I/O or electrical input for receiving information and interacting with external components. FIG. 3B illustrates a non-transitory computer-readable storage medium 330 comprising the instructions 308 (computer software).

FIG. 4 is an example state diagram illustrating the method 400 performed by the control system 300. The state diagram is configured to switch between a first operating mode 401 and a second operating mode 402 based on conditions 404, 406. The first operating mode 401 may be a normal or default operating mode for non-extended use of the battery 204 while the vehicle 1 is not running. The second operating mode 402 may be a user-requestable operating mode for extended use of the battery 204 while the vehicle 1 is not running.

In the first operating mode 401, the control system 300 deactivates the ancillary vehicle function 205 as part of a vehicle shutdown process immediately or not long after the control system 300 detects that the powertrain 201 of the vehicle 1 has entered a deactivated state. Detecting the deactivated state can comprise any appropriate detection that the vehicle 1 has been switched off such that the powertrain 201 is not operable to drive the vehicle 1, meaning that any torque demand (e.g., accelerator pedal depression) would not be acted upon. For example, the control system 300 may detect a vehicle-off power mode or similar 'key-off' event.

Deactivation of the ancillary vehicle function 205 after the deactivation of the powertrain 201 can be controlled by a timer, in some examples. The timer may initiate automatically in dependence on the detection of the deactivated state. The expiry duration of the timer depends on the implementation, but could be less than ten minutes or less than five minutes to minimise power drain.

In the second operating mode 402, the control system 300 enables the ancillary vehicle function 205 to be used for longer while the powertrain 201 is in the deactivated state. The ancillary vehicle function 205 will not be deactivated in dependence on the powertrain 201 entering the deactivated state. For example, the control system 300 may ignore or interrupt (e.g., pause) the timer if the second operating mode 402 has been entered.

In the second operating mode 402, the ancillary vehicle function 205 may be available for longer than an hour, assuming the battery 204 is initially fully charged. For hybrid vehicle traction batteries, the duration may be significantly longer.

FIG. 4 illustrates an entry condition 404 for transitioning from the first operating mode 401 to the second operating mode 402. The entry condition 404 may comprise a user entry condition. That is, the second operating mode 402 may be a user-requestable operating mode, requestable whenever the user wants extended use of the ancillary vehicle function 205. For example, the user may be able to request the second operating mode 402 via any appropriate human-machine interface, such as a touchscreen or tactile input device of the vehicle or an app on the user's personal hand-portable computing device. In some examples, the user is able to request the second operating mode 402 if various preconditions of the entry condition are satisfied. A precondition can comprise the vehicle 1 being parked and secured. The control system 300 could monitor the precondition based on a parking brake status, a park pawl status, the powertrain 201 being in the deactivated state, or a combination thereof. Another precondition may be that there is no ongoing hands-free telephony event utilizing the loudspeakers 206. In some examples, another precondition is that the battery 204 has an above-threshold state of charge.

FIG. 4 also illustrates the exit condition 406 for transitioning from the second operating mode 402 to the first operating mode 401. Various example events satisfying the exit condition are described below. In some examples, the exit condition 406 can be satisfied if a precondition of the entry condition 404 is no longer satisfied, such as the user activating the powertrain 201 or at least the engine 202, or the parking brake and/or park pawl being released, or a combination thereof. In some examples, the exit condition 406 can be satisfied by a user request to transition to the first operating mode, via a human-machine interface such as a touchscreen or tactile input device of the vehicle or an app on their personal hand-portable computing device.

The exit condition 406 comprises an energy use precondition in order to prevent the battery 204 from being drained excessively. The control system 300 monitors the energy use precondition to determine when to transition back to the first operating mode 401 (e.g., un-pause the timer to resume shutdown) or otherwise deactivate the ancillary vehicle function 205. The control system 300 enables the ancillary vehicle function 205 to be used as long as a monitored energy availability of the battery 204 is greater than a depletion limit of the battery 204. Assuming the battery 204 was initially charged, this should provide a much longer duration of use of the ancillary vehicle function 205 than permitted by the timer.

In an example implementation, the monitored energy availability of the battery 204 comprises a state of charge. The depletion limit of the battery 204 comprises a minimum threshold state of charge for providing an engine-start reserve. Note that in some examples, the control system 300 does not automatically start the engine 202 to generate power in response to the depletion limit being reached, and instead the engine-start reserve is a state of charge that is calibrated to be enough to enable user-requested engine start after a long stand-time. The depletion limit may be calibrated to be at a high enough level to enable the engine 202 to be reliably started in a wide range of climactic conditions after a minimum stand time (e.g., longer than seven days).

According to an aspect of the invention, the depletion limit of the battery 204 is variable rather than static. The depletion limit is dependent on one or more monitored variable parameters.

The depletion limit may track the health or condition of the battery 204. For example, the depletion limit may be configured to rise in dependence on at least one of:

- monitored capacity of the battery 204 falling;
- monitored internal resistance of the battery 204 rising;
- monitored temperature of the battery 204 being below a cold temperature threshold; or
- monitored temperature of the battery 204 being above a hot temperature threshold.

If the battery 204 is brand new, for example, the depletion limit could be as low as 30% state of charge, or some other value less than 45%. This is because the new battery cells 203 are able to supply a reliable engine start voltage during engine start (cranking), even with a low state of charge.

If the battery 204 is aged, the depletion limit could be higher than 55% and may be higher than 75%. This is because the aged battery cells 203 need to be at a higher state of charge in order to supply a reliable engine start voltage.

The energy that can be accessed from the battery 204 is similarly affected by temperature, particularly as the battery 204 gets colder. The cold temperature threshold could have a value of approximately −10 Celsius (C) or another value from the range +5 C to −20 C. The hot temperature threshold could have a value from the range +40 C to +85 C.

In some implementations, a combination of the above variable parameters can affect the depletion limit. For example, the depletion limit can rise in dependence on temperature being outside a threshold/window, and in dependence on cumulative DC internal resistance growth, and in dependence on capacity fade.

The depletion limit may be determined in dependence on an aging model that takes into account at least some of the above parameters cumulatively over dozens, hundreds or thousands of operational hours. The aging model may be expressed as a capacity or any other appropriate units. In some examples, the aging model may be automatically corrected in dependence on measured voltage drop during engine cranking. The model for determining the depletion limit may be based on calibration as a function 205 of the aging state and the present temperature.

In the second operating mode 402, the control system 300 may be configured to render to the user a useful indication of a closeness of the monitored energy availability is to the depletion limit, before the depletion limit is reached. For example, the control system 300 may be configured to cause one or more output devices to output user feedback indicating the closeness.

Figure 5:
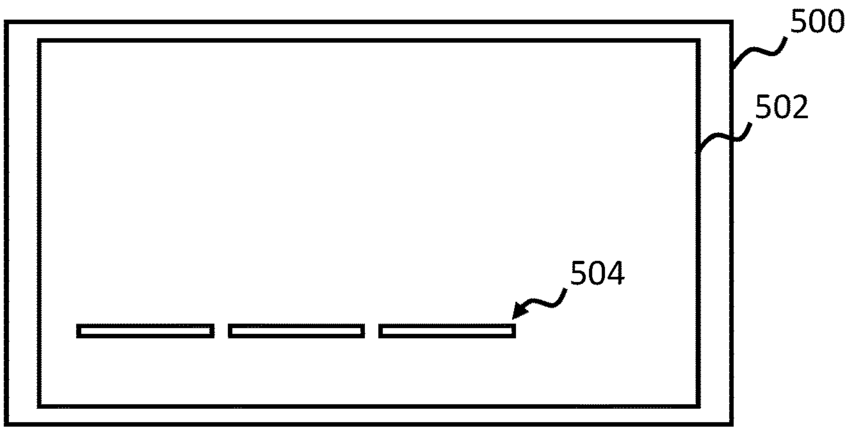
FIG. 5 illustrates an example of an output device rendering a graphical user interface.

FIG. 5 illustrates an example in which the user feedback comprises a visual scale 504 displayed on a graphical user interface 502 on a display 500, the visual scale 504 having a minimum set at the depletion limit and a maximum set at 100% state of charge or other suitable maximum. The visual scale 504 in FIG. 5 comprises segments in the form of bars, with the maximum number of bars (e.g., three) corresponding to maximum state of charge and zero bars indicating that the depletion limit is reached. It would be appreciated that different forms of user feedback could be rendered, not limited to bars.

In some examples, the control system 300 is configured to normalise the visual scale 504 with respect to the variable depletion limit. That is, the minimum of the visual scale 504 is set to the variable value of the depletion limit. This is intuitive for the user.

In some examples, the control system 300 may render one or more alerts, such as an audio and/or visual alert, when the depletion limit is approached or reached. For example, two alerts can be rendered progressively, each corresponding to a different delta between the current state of charge and the depletion limit.

Figure 6:
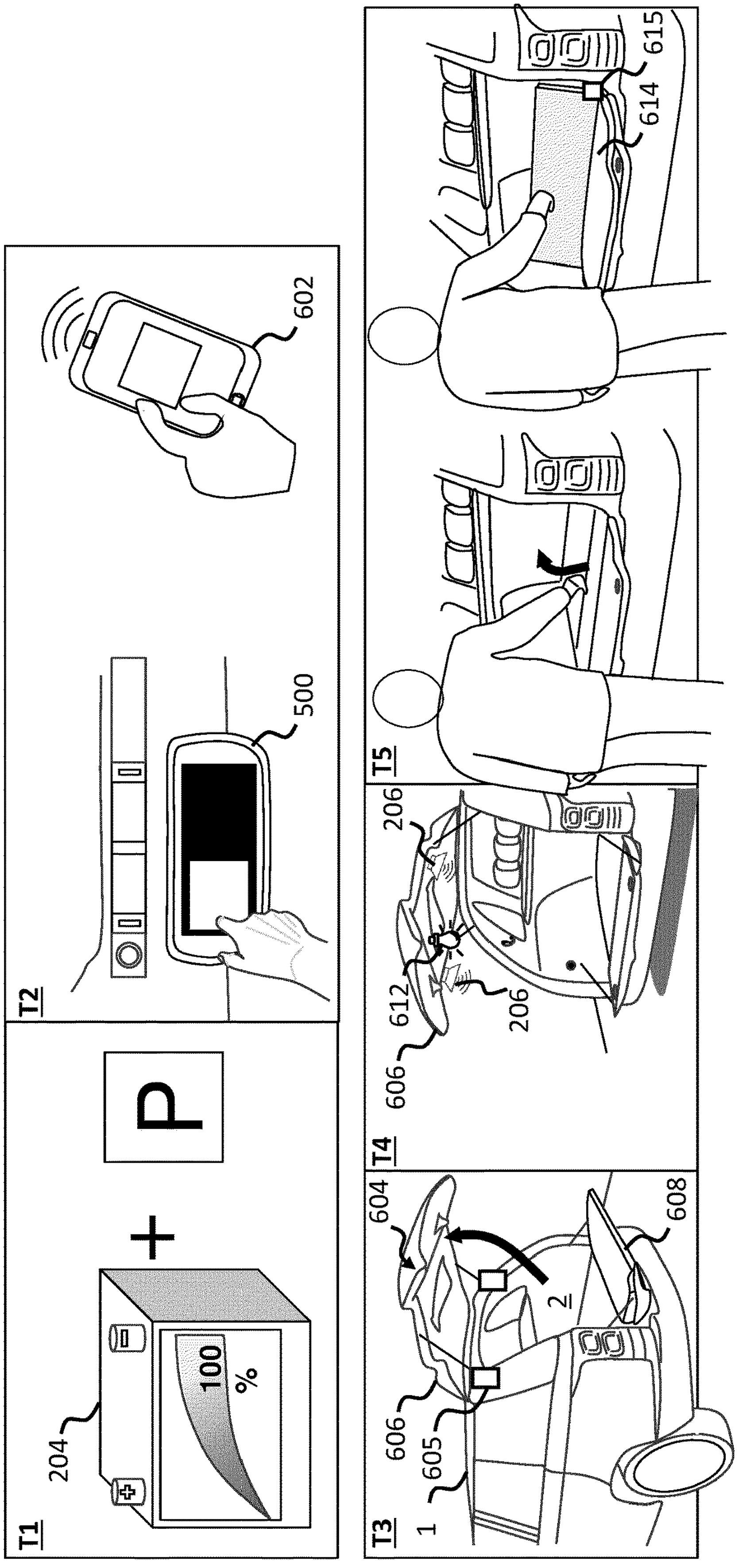
FIG. 6 illustrates an example storyboard.

FIG. 6 is a storyboard illustrating an example non-limiting implementation of the control methods described herein. Five panels illustrate five steps/times T1-T5. In this example, the second operating mode 402 is a Tailgate Event mode for enabling the battery 204 to power a tailgate event or similar leisure activity. For example, certain rear loudspeakers 206 may be activated or audio may be faded rearwardly towards said loudspeakers 206. The rear loudspeakers 206 may be mounted to a rear tailgate closure or otherwise located in or pointing to the rear cargo area. The electrical receptacle 207 and/or wireless audio may remain available.

Panel T1 of FIG. 6 figuratively illustrates some requirements for the second operating mode 402 of FIG. 4 in this tailgate event example. A first requirement is that the battery 204 has a state of charge above a threshold such as a threshold of X % above the depletion limit where X is approximately 10% or another value from the range 5% to 50%. A second requirement is that the vehicle 1 is parked and secured as described earlier. A further requirement may be that there is no ongoing hands-free telephony event utilizing the loudspeakers 206. Non-satisfaction of any one of these requirements may cause the second operating mode 402 to be non-activatable or to transition back to the first operating mode 401.

Panel T2 figuratively illustrates how a user may request the second operating mode 402. For example, the option to activate the second operating mode 402 may be a menu item in a touchscreen display 500 of a centre console or instrument cluster. Additionally, or alternatively, the second operating mode 402 can be requested wirelessly from a user's mobile equipment 602 such as via a mobile phone app.

Panel T3 figuratively illustrates how the second operating mode 402 may require a rear tailgate 604 of a rear cargo area 2 of the vehicle 1 to be opened. For example, if the rear tailgate 604 is a powered tailgate, the control system 300 may cause a rear tailgate power mechanism 605 to open the rear tailgate 604 automatically when the second operating mode 402 is initiated. Alternatively, if the rear tailgate 604 is unpowered, the user may be directed to open the rear tailgate 604, for example via a displayed instruction.

In the illustrated example, the tailgate 604 is a split tailgate comprising an upper tailgate closure 606 and a lower tailgate closure 608, one or both of which may be powered. The lower tailgate closure 608 may be configured to fold down so that a user can sit on the lower tailgate closure 608 or on a tailgate seating arrangement 614 supported at least partially by the lower tailgate closure 608.

Panel T4 figuratively illustrates useful tailgate event functions of the second operating mode 402. One or more tailgate-mounted loudspeakers 206 may be kept active despite the powertrain 201 being in the deactivated state. Cabin-mounted loudspeakers such as front loudspeakers may be deactivated to preserve battery life, since they are not necessarily needed in a tailgate event.

Another useful tailgate event feature is the electrical receptacle 207 (not shown in FIG. 6) which could be located in or near the tailgate 604 and may be kept active. Another useful tailgate event feature is a rear cargo area lamp 612 which may be manually activatable or automatically activated/activatable for the extended duration.

Another useful tailgate event feature is for hands-free telephony to be automatically disabled in the second operating mode 402 despite wireless audio being available, so that an incoming call or notification does not interrupt the playback of music/audio.

Another useful tailgate event feature is for a hands-free powered tailgate request function (gesture tailgate function) to be automatically disabled in the second operating mode 402, so that users can tuck their feet under the rear bumper of the vehicle 1 without triggering a tailgate close command from a bumper-mounted sensor.

Another useful tailgate event feature is for at least part of a proximity-based vehicle locking function (walkaway locking function) to be automatically disabled in the second operating mode 402, so that users can walk away from the vehicle 1 without an audible sound (e.g., chime) being rendered. The function of the audible sound may be to act as a warning that is rendered via a loudspeaker(s) 206 when a device of the user is detected to be away from the vehicle 1 if a closure of the vehicle 1 is detected as open (such as the tailgate).

Another useful tailgate event feature is for a rear microphone to be automatically enabled in the second operating mode 402 to enable a hands-free virtual assistant function to more reliably recognise voice commands from users at the rear cargo area 2. The rear microphone may be proximal to the rear cargo area 2.

Another useful tailgate event feature is for the engine 202 to not activate automatically when the depletion limit of the battery 204 is reached, and instead for the control system 300 to transition back to the first operating mode 401 or otherwise to deactivate the second operating mode 402. This is to ensure that users in proximity to the rear tailgate 604 are not subjected to engine exhaust emissions. In other words, the second operating mode is permitted when the powertrain 201 of the vehicle 1 is in a deactivated state but not when the powertrain 201 of the vehicle is in an activated state.

Panel T5 figuratively illustrates the user deploying an optional tailgate seating arrangement 614 such as a deployable seat base and/or deployable seat back for one or more users, to allow the user to comfortably sit in the cargo area 2 of the vehicle while enjoying their tailgate event. The tailgate seating arrangement 614 may be attachable to one or more attachment points 615 or may be an integrated feature of the rear cargo area 2.

When the user is finished with their tailgate event, they may initiate deactivation of the second operating mode 402. In some examples, the exit condition 406 can be triggered by a user request to transition to the first operating mode, via a human-machine interface of the type described above. In some examples, the exit condition 406 can be triggered by detected closing of a rear tailgate closure. As described earlier, the second operating mode 402 deactivate automatically in response to the depletion limit being reached, the user starting the engine, or the parking brake/park pawl being released so that the user is no longer secured.

It will be appreciated that various changes and modifications can be made to the present invention without departing from the scope of the present application.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A control system for a vehicle, the control system comprising one or more controllers, wherein the control system is configured to:

in a first, default operating mode, deactivate an ancillary vehicle function in dependence on a powertrain of the vehicle entering a deactivated state responsive to a vehicle-off event, wherein in the first operating mode, the ancillary vehicle function is deactivated after a predetermined duration has elapsed following the vehicle-off event; and in a second operating mode triggered by a user request, enable the ancillary vehicle function to be used while the powertrain is in the deactivated state responsive to the vehicle-off event, such that in the second operating mode, the ancillary vehicle function is enabled to be used for a second duration following the vehicle-off event that is longer than the predetermined duration, the second duration in dependence on monitored energy availability of a battery of the vehicle being greater than a depletion limit of the battery, wherein the depletion limit of the battery is dependent on one or more monitored variable parameters.

2. The control system of claim 1, wherein the one or more monitored variable parameters are indicative of at least one of:

capacity of the battery;

internal resistance of the battery; or temperature of the battery.

3. The control system of claim 2, wherein the depletion limit is configured to rise in dependence on at least one of:

capacity of the battery falling;

internal resistance of the battery rising;

temperature of the battery being below a first threshold; or temperature of the battery being above a second threshold.

4. The control system of claim 1, wherein the depletion limit comprises an engine-start reserve.

5. The control system of claim 1, wherein the control system is configured to transition from the second operating mode to the first operating mode in dependence on the depletion limit of the battery being reached, and, once in the first operating mode, the ancillary vehicle function is deactivated after the predetermined duration.

6. The control system of claim 1, wherein in the first operating mode, a timer is activated in response to the vehicle-off event and the deactivation of the ancillary vehicle function is responsive to expiration of the timer, the timer configured to expire after the predetermined duration has elapsed.

7. The control system of claim 6, wherein in the second operating mode, the timer is paused such that the ancillary vehicle function is enabled beyond the predetermined duration.

8. The control system of claim 7, wherein, in the second operating mode, when the monitored energy availability of the battery reaches the depletion limit, the timer is un-paused and the ancillary vehicle function is deactivated responsive to the expiration of the timer.

9. The control system of claim 1, wherein the second operating mode is triggered by the user request entered via a machine-human interface, the machine-human interface comprising a touchscreen of the vehicle, a tactile input device of the vehicle, or an app on a hand-portable computing device.

10. The control system of claim 1, wherein the ancillary vehicle function comprises a vehicle entertainment function.

11. The control system of claim 10, wherein the ancillary vehicle function comprises a loudspeaker function.

12. The control system of claim 1, wherein operating in the second operating mode requires a rear tailgate of the vehicle to be opened.

13. The control system of claim 12, wherein operation in the second operating mode further requires a parking brake being activated.

14. The control system of claim 1, further configured to cause one or more output devices to output user feedback indicating a closeness of the monitored energy availability to the depletion limit, wherein the user feedback comprises a visual scale having a minimum set at the depletion limit and/or an alert configured to indicate when the depletion limit is reached.

15. The control system of claim 1, wherein the battery comprises a starting-lighting-ignition (SLI) battery configured to start an engine of the vehicle, and wherein the SLI battery comprises a nominal voltage of less than 60V.

16. The vehicle comprising the control system and ancillary vehicle function of claim 1.

17. The control system of claim 1, wherein enabling the ancillary vehicle function in the second operating mode comprises enabling one or more rear loudspeakers while one or more front loudspeakers are deactivated.

18. The control system of claim 17, wherein a proximity-based vehicle locking function is automatically disabled in the second operating mode.

19. A method comprising:

determining that a vehicle is operating in a first operating mode and that a first vehicle-off event has occurred causing a powertrain of the vehicle to enter a deactivated state, and in response, deactivating an ancillary vehicle function of a vehicle; and determining that a user has requested that the vehicle operate in a second operating mode and that a second vehicle-off event has occurred causing the powertrain of the vehicle to enter the deactivated state, and in response, enabling the ancillary vehicle function to be used while the powertrain is in the deactivated state, in dependence on monitored energy availability of a battery of the vehicle being greater than a depletion limit of the battery, wherein the depletion limit of the battery is dependent on one or more monitored variable parameters.

20. Non-transitory computer-readable storage medium storing software that, when executed, is arranged to perform the method according to claim 19.

* * * * *